US007471989B2

(12) United States Patent
Hansen et al.

(10) Patent No.: US 7,471,989 B2
(45) Date of Patent: Dec. 30, 2008

(54) IDENTIFICATION OF ENGINEERING INTENT REQUIREMENTS IN AN ELECTRONIC ENVIRONMENT

(75) Inventors: Allan M. Hansen, Glencoe, MO (US); Bradley K. Jackson, Florissant, MO (US); Lawrence W. Rogers, Kenmore, WA (US); Scott A. Schieferdecker, O'Fallon, MO (US); David W. Patterson, Lynnwood, WA (US); Philip H. Farcy, Ashford, WA (US); Carl E. Bouffiou, Tacoma, WA (US); Jerry D. Zayic, Renton, WA (US)

(73) Assignee: The Boeing Company, Chicago, IL (US)

( * ) Notice: Subject to any disclaimer, the term of this patent is extended or adjusted under 35 U.S.C. 154(b) by 579 days.

(21) Appl. No.: 10/788,048

(22) Filed: Feb. 26, 2004

(65) Prior Publication Data
US 2005/0192786 A1 Sep. 1, 2005

(51) Int. Cl.
*G06F 19/00* (2006.01)
(52) U.S. Cl. .................. 700/97; 700/98; 700/103; 707/2
(58) Field of Classification Search .................. 700/97, 700/98, 103; 707/2, 10, 100, 104
See application file for complete search history.

(56) References Cited

U.S. PATENT DOCUMENTS

| 4,796,194 A | 1/1989 | Atherton |
| 4,835,683 A | 5/1989 | Phillips et al. |
| 5,019,961 A | 5/1991 | Addesso et al. |
| 5,019,992 A | 5/1991 | Brown et al. |
| 5,065,338 A | 11/1991 | Phillips et al. |
| 5,355,317 A | 10/1994 | Talbott et al. |
| 5,357,440 A | 10/1994 | Talbott et al. |
| 5,515,524 A | 5/1996 | Lynch et al. |
| 5,586,052 A | 12/1996 | Iannuzzi et al. |
| 5,630,025 A | 5/1997 | Dolby et al. |
| 5,659,478 A | 8/1997 | Pennisi et al. |
| 5,680,530 A | 10/1997 | Selfridge et al. |
| 5,708,798 A | 1/1998 | Lynch et al. |
| 5,745,765 A | 4/1998 | Paseman |
| 5,748,943 A | 5/1998 | Kaepp et al. |
| 5,761,674 A | 6/1998 | Ito |

(Continued)

OTHER PUBLICATIONS

"Using Callouts and Autoshapes in FrontPage 2002", http://www.webworksite.com/callouts.shtml.*

(Continued)

*Primary Examiner*—Michael D Masinick

(57) ABSTRACT

Methods for defining engineering requirements in an electronic environment are disclosed. In one embodiment, a method includes providing at least one of a set of master requirements and a set of version requirements to be applied to the electronic product definition, and referencing an electronic reference document from at least one of the set of master requirements and the set of version requirements, the electronic reference document including one or more particular engineering requirements to be applied to the electronic product definition. Alternately, a method includes defining a callout linked to the at least one of the set of master requirements and the set of version requirements, the callout being adapted to supersede a conflicting engineering requirement set forth in at least one of the set of master requirements and the set of version requirements.

32 Claims, 9 Drawing Sheets

U.S. PATENT DOCUMENTS

| | | | |
|---|---|---|---|
| 5,781,446 A | 7/1998 | Wu | |
| 5,781,454 A | 7/1998 | Alexander | |
| 5,805,861 A | 9/1998 | Gilbert et al. | |
| 5,808,432 A | 9/1998 | Inoue et al. | |
| 5,809,282 A | 9/1998 | Cooper et al. | |
| 5,825,651 A | 10/1998 | Gupta et al. | |
| 5,856,925 A | 1/1999 | Maeda et al. | |
| 5,963,207 A | 10/1999 | Brewer et al. | |
| 5,963,953 A | 10/1999 | Cram et al. | |
| 6,023,699 A | 2/2000 | Knoblock et al. | |
| 6,124,855 A | 9/2000 | Sells | |
| 6,292,804 B1 * | 9/2001 | Ardoin et al. | 707/102 |
| 6,332,040 B1 | 12/2001 | Jones | |
| 6,405,308 B1 | 6/2002 | Gupta et al. | |
| 6,438,535 B1 * | 8/2002 | Benjamin et al. | 707/2 |
| 6,584,479 B2 * | 6/2003 | Chang et al. | 715/512 |
| 6,675,294 B1 | 1/2004 | Gupta et al. | |
| 6,871,108 B2 * | 3/2005 | Carlucci et al. | 700/98 |

OTHER PUBLICATIONS

"How about a Shout Out for Callouts", Paul F. Aubin, Aubin Consulting Services. Autodesk University, Las Vegas, NV—Nov. 30, 2004.*

"Requirements Traceability" -Mirka Palo, University of Helsinki Department of Computer Science, Oct. 30, 2003.*

* cited by examiner

IDENTIFICATION OF ENGINEERING INTENT REQUIREMENTS IN AN ELECTRONIC ENVIRONMENT

FIELD OF THE INVENTION

The present invention relates to defining engineering requirements in a product definition, and more specifically, to identification of engineering intent requirements in an electronic environment.

BACKGROUND OF THE INVENTION

As industry moves from paper drawing definition of products to computer model definition, the need to represent engineering intent associated to the product components is critical for the users of the product information. This information has traditionally been placed on the face of the drawing as specific information callouts (e.g. dimensions, tolerances, notes, etc.). These engineering requirements need to be associated and available with the design model and related appropriately to the product. Users of the engineering definition need to have access to this engineering intent information independently from the physical models. For example, engineering intent information such as surface finish requires specific process planning for manufacturing, and specific instructions for quality inspection. An explicit callout of these engineering intent requirements provides this independent access and configuration control.

For example, FIG. 1 is a schematic view of a set of engineering intent requirements for a product 100 in accordance with the prior art. Explicit callouts for various engineering intent requirements are shown in FIG. 1, including a hole class specification 102, a dimensional callout 104, one or more surface finish specifications 106, one or more manufacturing operation callouts 108, and a material specification 110. Of course, a variety of alternate engineering intent requirements may be conceived.

Although desirable results have been achieved using the prior art method of expressing engineering intent requirements, in the modern day practice of electronic design and modeling of products, there is room for improvement. Specifically, the prior art method of providing explicit callouts on engineering drawings may be inefficient, unwieldy, and impractical as product definition moves away from engineering drawings toward product modeling in an electronic environment.

SUMMARY OF THE INVENTION

The present invention is directed to methods for defining engineering requirements in an electronic environment. Apparatus and methods in accordance with the present invention may advantageously provide engineering intent requirements in an electronic environment in an orderly and logical hierarchy, thereby providing efficient and flexible definition of engineering requirements for electronically-modeled products.

In one embodiment, a method for defining a set of electronic engineering requirements of an electronic product definition includes providing at least one of a set of master requirements and a set of version requirements to be applied to the electronic product definition. The method further includes referencing an electronic reference document from at least one of the set of master requirements and the set of version requirements, the electronic reference document including one or more particular engineering requirements to be applied to the electronic product definition.

In an alternate embodiment, a method for defining a set of electronic engineering requirements of an electronic product definition includes providing at least one of a set of master requirements and a set of version requirements to be applied to the electronic product definition. The method further includes defining a callout linked to at least one of the set of master requirements and the set of version requirements, the callout being adapted to supercede a conflicting engineering requirement set forth in at least one of the set of master requirements and the set of version requirements.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to methods for defining engineering intent requirements in an electronic environment. Many specific details of certain embodiments of the invention are set forth in the following description and in FIGS. 2-7 to provide a thorough understanding of such embodiments. One skilled in the art, however, will understand that the present invention may have additional embodiments, or that the present invention may be practiced without several of the details described in the following description.

In brief, embodiments of the present invention may advantageously provide engineering intent requirements in an electronic environment, including, for example, indicating characteristics of engineering requirements, objects, and relationships for the development and production of products. As used herein, an engineering intent requirement is reusable information used in conveying the constraints of an engineering design, such as, for example, as part of the technical information that was traditionally portrayed on engineering drawings through annotations, within traditional parts lists as notes, and by other traditional means.

Figure 1:
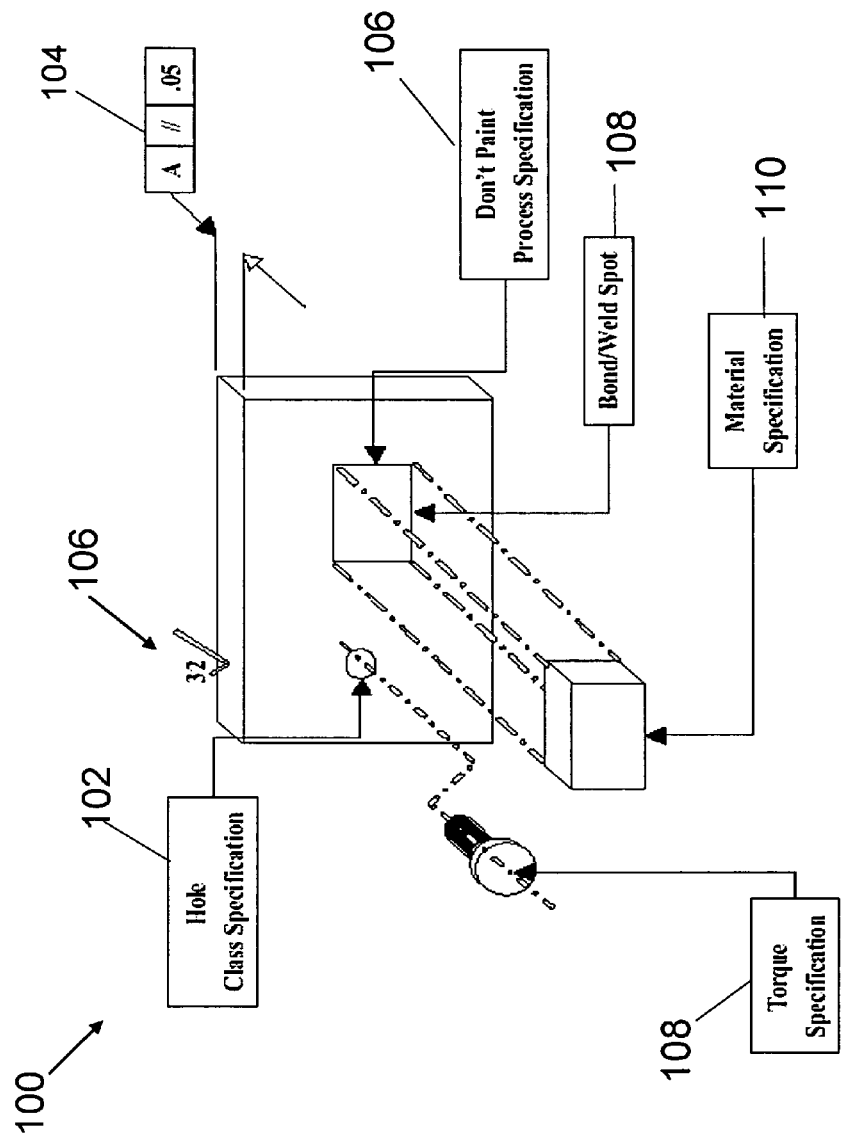
FIG. 1 is a schematic view of a set of engineering intent requirements for a product in accordance with the prior art.
Figure 2:
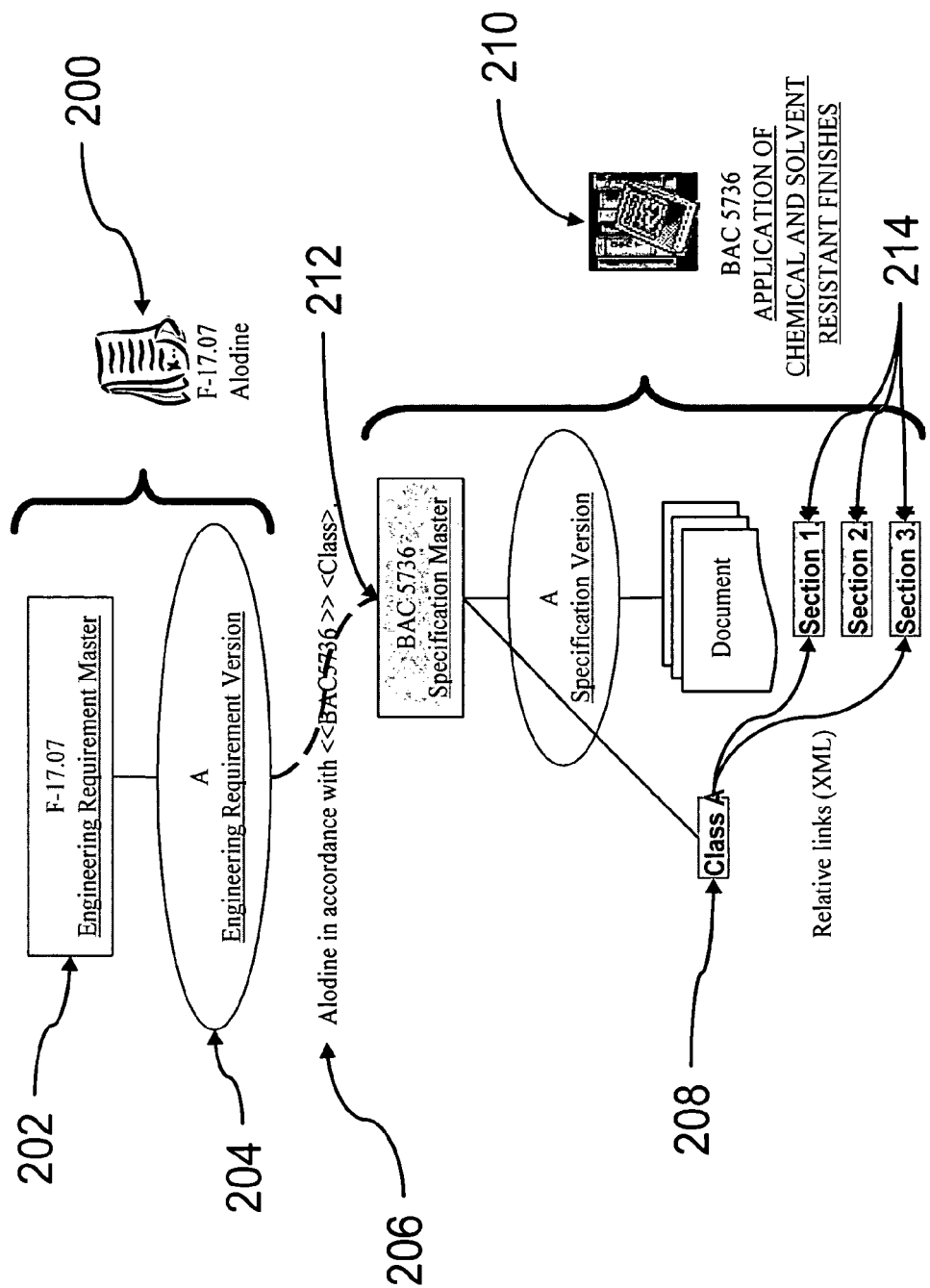
FIG. 2 is a schematic view of a set of electronic engineering intent requirements in accordance with an embodiment of the present invention.

FIG. 2 is a schematic view of a set of electronic engineering intent requirements 200 in accordance with an embodiment of the present invention. In this embodiment, the set of electronic engineering intent requirements 200 is composed of an engineering requirement master 202 and an engineering requirement version 204. The engineering requirement version 204 contains text qualifying the requirement, and references an electronic document 212 that defines an approved process for accomplishing the requirement, such as, for example, manufacturing processes, material specifications, etc.

In one particular embodiment, for example, the engineering requirement version 204 may reference a standardized metal finishing process, such as "Alodine in accordance with BAC5736 Class A" 206. In this representative example, the statement to "Alodine" is the requirement for the part, the requirement then references the document (BAC5736) 212 and a qualification (Class A) 208 within the document 212. The reference within the engineering requirement may be made to a general document location 210 (e.g. an electronic address or suitable location identifier). A user may then search the document to find the information that is pertinent to the respective engineering requirement 214.

Figure 6:
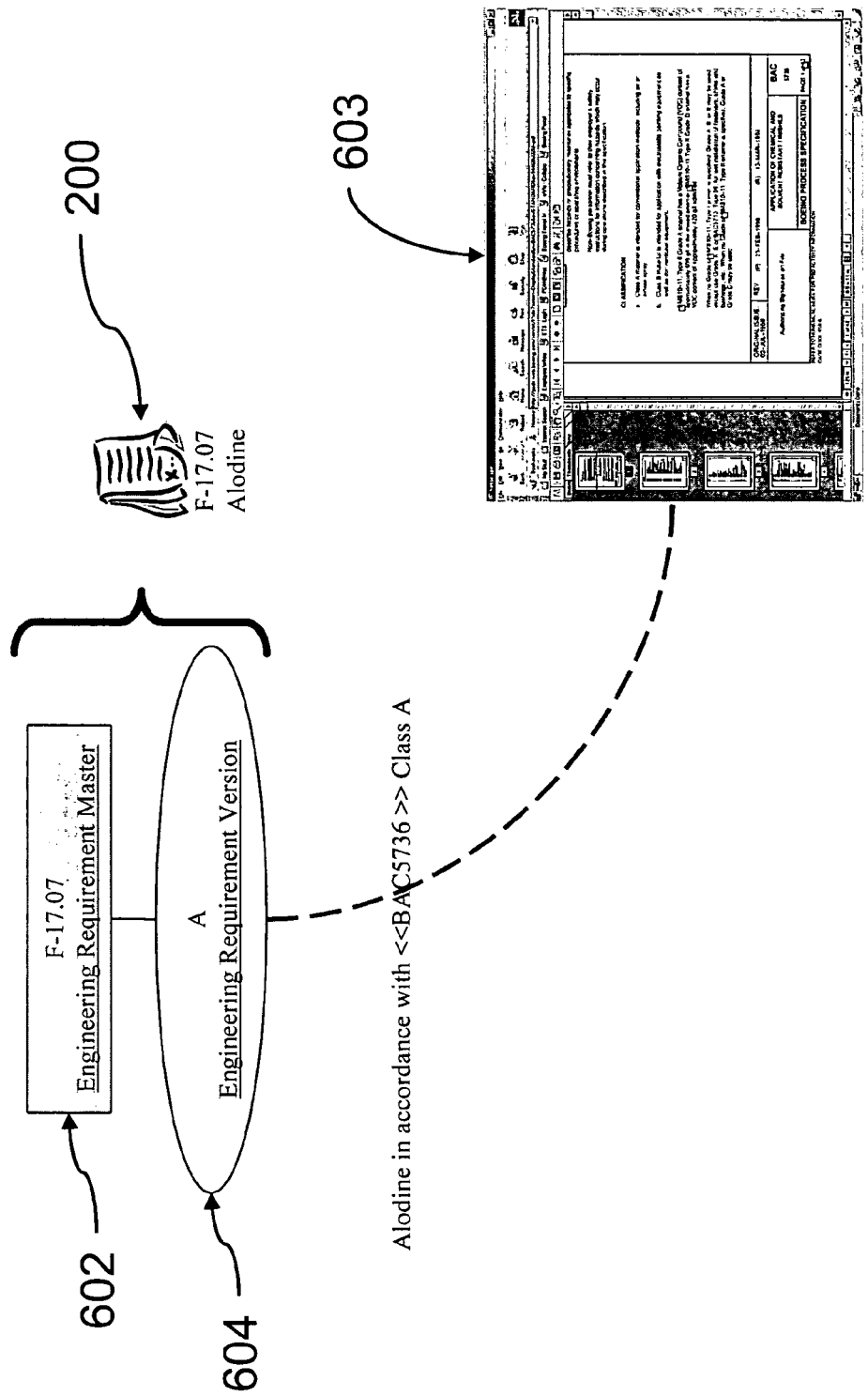
FIG. 6 is a schematic view of a set of electronic engineering intent requirements in the case of a reference to an external document in accordance with another embodiment of the present invention.

FIG. 6 is a schematic view of a set of electronic engineering intent requirements 200 is composed of an engineering requirement master 602 and an engineering requirement version 604 in the case of a reference to an external document 603.

Figure 3A:
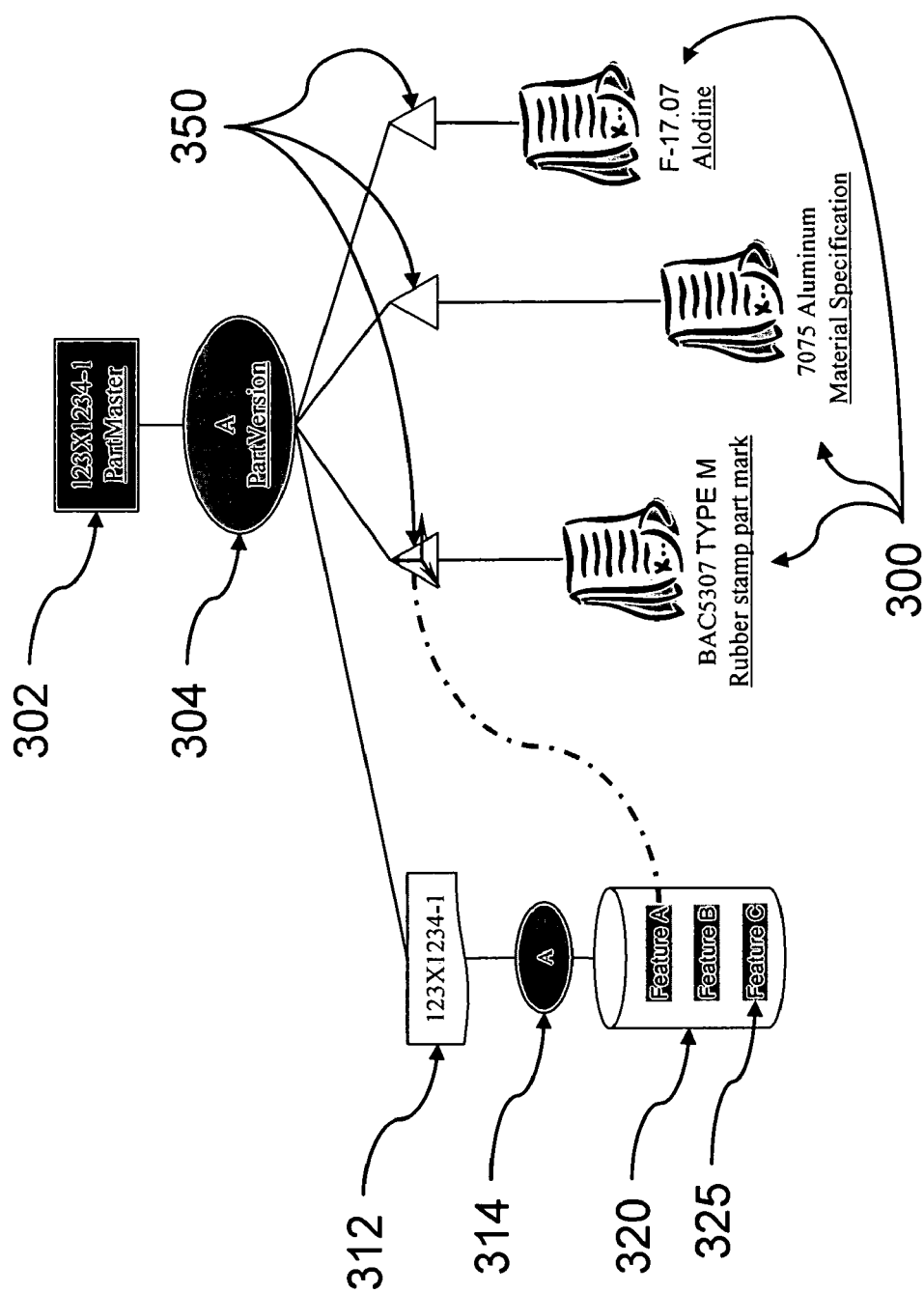
FIGS. 3A through 3C are schematic views of a set of engineering requirement callouts for detail structures, assembly structures, and product structures, respectively, in accordance with alternate embodiments of the present invention.
Figure 3B:
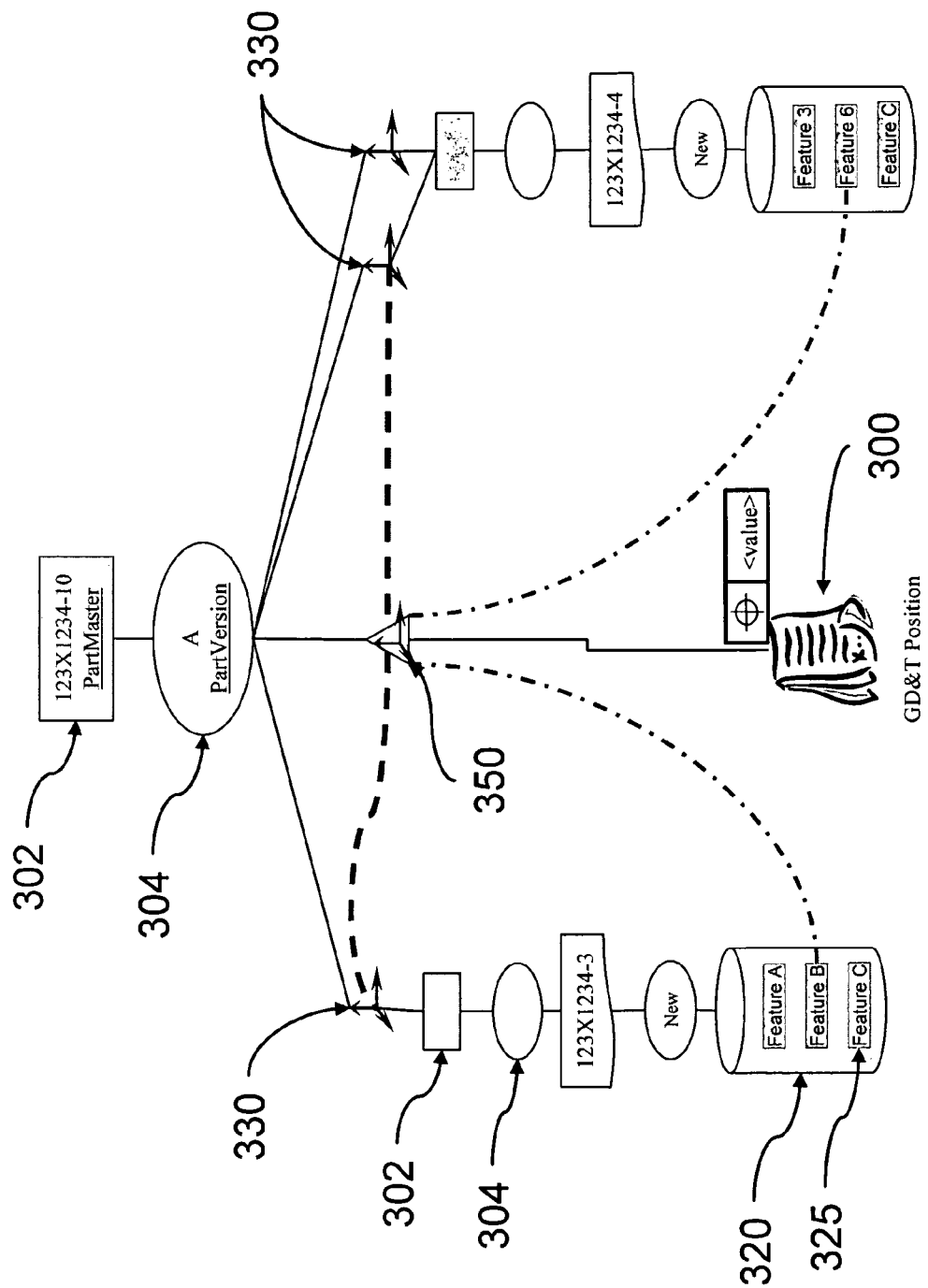
Figure 3C:
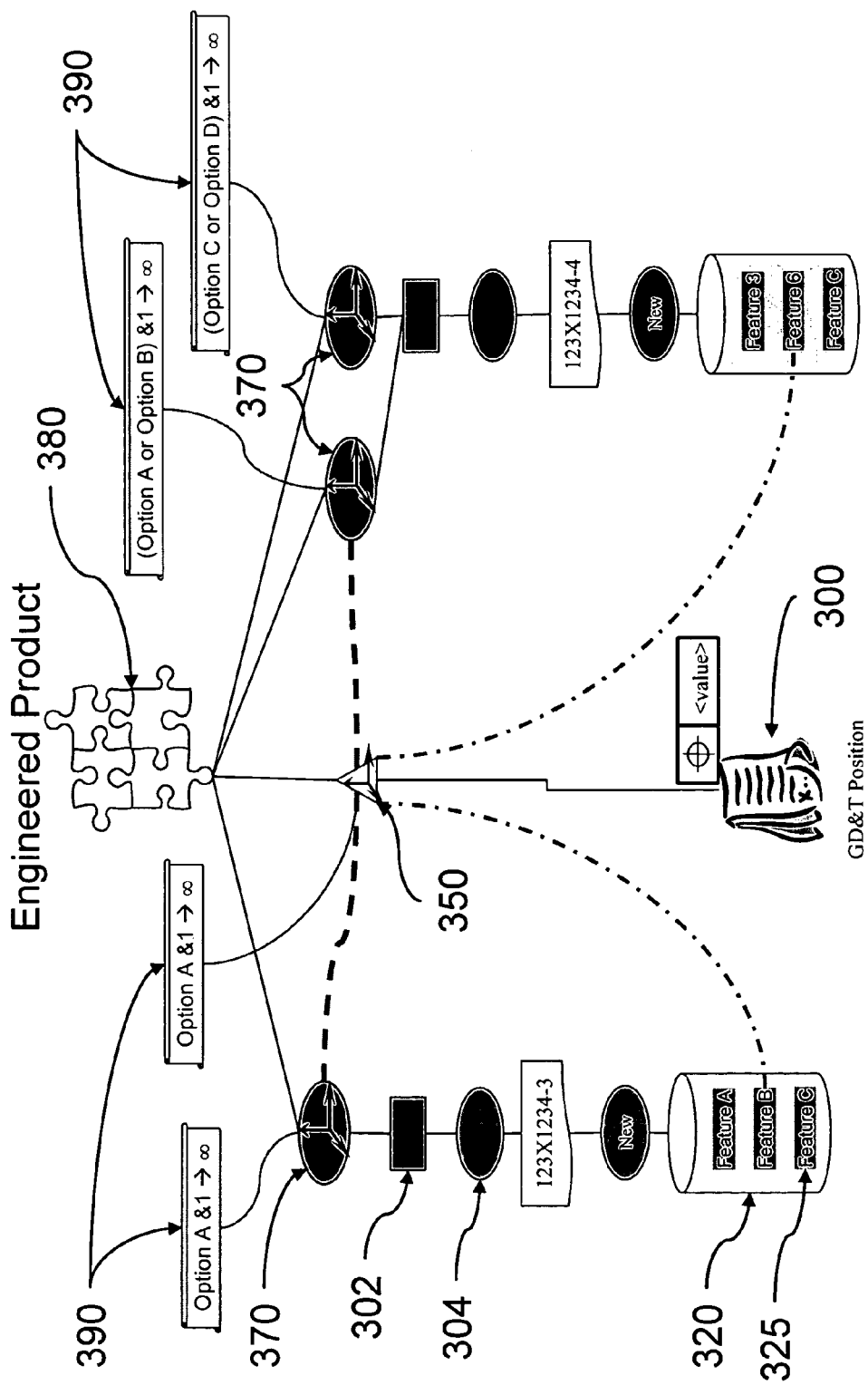

FIGS. 3A through 3C are schematic views of a set of engineering requirement callouts for detail structures, assembly structures, and product structures, respectively, in accordance with alternate embodiments of the present invention. As shown in FIG. 3A, Engineering Requirement Callouts may be applied to the definition of an individual part.

An Engineering Requirement Callout is an electronic callout of an Engineering Requirement that defines the use of a requirement on a product. An Engineering Requirement Callout on a product is controlled by an applicability statement. An Engineering Requirement Callout is linked to an Engineering Requirement, and optionally, features of the 3 D design. An Engineering Requirement Callout is available to be linked to a process to be fulfilled in the manufacturing of the product. Engineering Requirement Callouts provide a method allowing accountability of the requirement callout for manufacturing consumption. Engineering Requirement Callouts may advantageously enrich the engineering design, as described more fully below.

For example, in the embodiment shown in FIG. 3A, the part is composed of a Part Master 302, Part Version 304, associated Document Master 312, Document Version 314, and the Geometry 320. The Geometry 320 may be composed of Features 325 (a surface, edge, fillet, etc. defining the shape of the part). Engineering Requirement Callouts at the part level 350, point to the Engineering Requirement 300, the Part Version 304, and optionally to Features 325 of the Geometry of the Part. These types of Engineering Requirement Callouts are considered part and parcel of the Part and are controlled by the Part Version (i.e., once the design is approved, you must create a new Part Version to change the Engineering Requirement Callout).

Engineering Requirement Callouts may be applied to the definition of an Assembly Part as shown on FIG. 3B. The Assembly Part is composed of a Part Master 302 and a Part Version 304. The Assembly Part Version is defined by the usage 330 of component Parts (each of which may be individual parts or sub-assemblies themselves). Engineering Requirement Callouts at the assembly level 350, point to the Engineering Requirement 300, usages 330 of the component parts, and to Features 325 of the Geometry 320 of the component parts. Engineering Requirement Callouts at the assembly level are considered part and parcel of the Assembly Part and are controlled by the Assembly Part Version (i.e., once the design is approved, you must create a new Assembly Part Version to change the Engineering Requirement Callout).

Engineering Requirement Callouts may be applied to the definition of the top level Product (a car, airplane, or toaster, for example) as shown on FIG. 3C. A Product is composed of Instances 370 of Parts (these could be either individual Parts or Assembly Parts). Engineering Requirement Callouts at the product level 350 point to the Engineering Requirement 300, Instances 370 of Parts, and optionally to Features 325 of the Geometry 320 of the instanced parts. Engineering Requirement Callouts at the product level are controlled by Applicability Statement 390. Applicability specifies conditions of when Instances and Engineering Requirement Callouts are valid on the Product. In FIG. 3C, the Engineering Requirement Callout 350 will be applied on units of the Product 380 built with Option A, for example.

Figure 7:
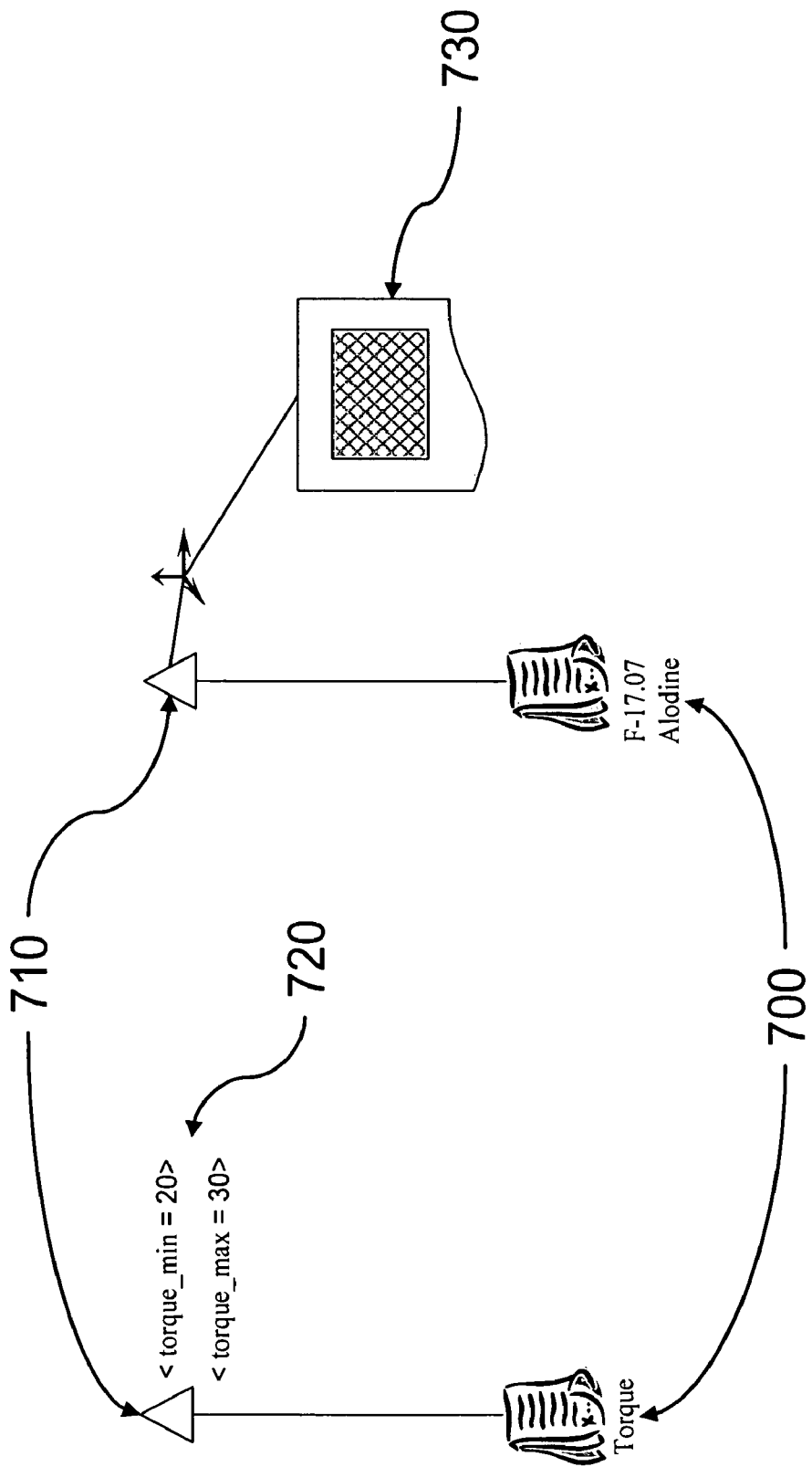
FIG. 7 is a schematic view of a set of engineering requirement callouts for additional features in accordance with another alternate embodiment of the present invention.

Engineering Requirement Callouts defined at the individual part, assembly, or product level may also be qualified in several ways as depicted in FIG. 7. The Engineering Requirement Callout 710 may be spatially qualified by an attached Shape 730 defining the physical limits that the Engineering Requirement is to affect. The Shape 730 may specify that the Alodine finish is only to be applied to a portion of a feature of the part for example. The Engineering Requirement Callout 710 may also be quantitatively qualified by Named Values 720. The Named Values 720 may specify the maximum and minimum torque values that must be applied to an instance of a fastener, for example.

Figure 4:
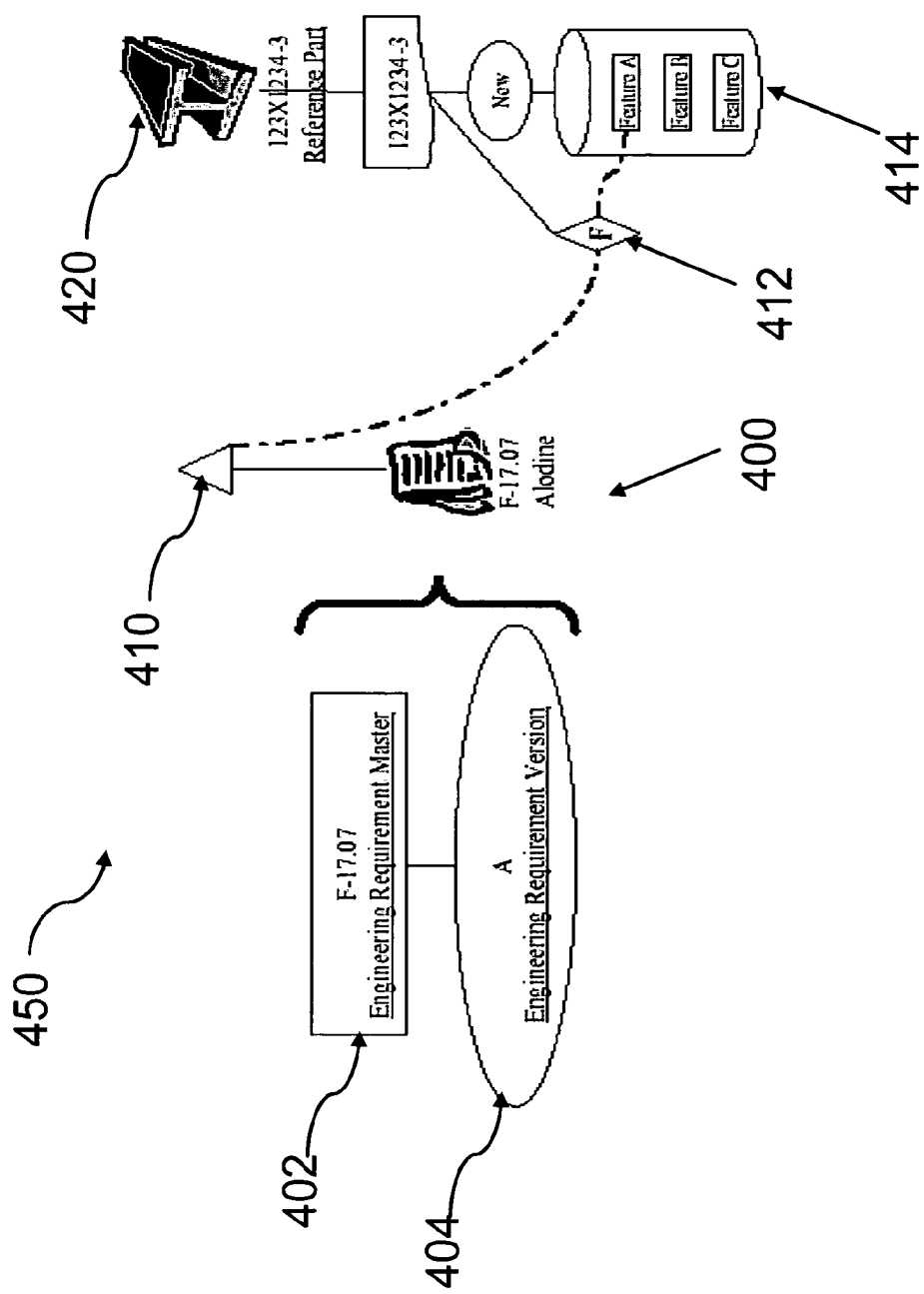
FIG. 4 is a schematic view of an electronic product definition including a set of electronic engineering intent requirements in accordance with yet another embodiment of the present invention.

FIG. 4 is a schematic view of an electronic product definition 450 including a set of electronic engineering requirements 400 in accordance with yet another embodiment of the present invention. The engineering requirements 400 include one master requirement 402, one or more version requirements 404, and a callout 410. In this embodiment, however, the callout 410 references a feature 412 or a set of features 414. The set of features 414 represent product characteristics or attributes that are independently addressable or selectable by an end-user during a product development phase. In one particular embodiment, the feature 412 supercedes any conflicting engineering requirements set forth in the master requirements 402 and the version requirements 404. Alternately, in another particular embodiment, selection of the various features 414 have no impact on, and do not conflict with, any of the other engineering requirements 402, 404 of the part 420. Therefore, a change to one of the features 414 of a part (or product) 420 will not affect the other engineering requirements that have been made to the part 420.

Figure 5:
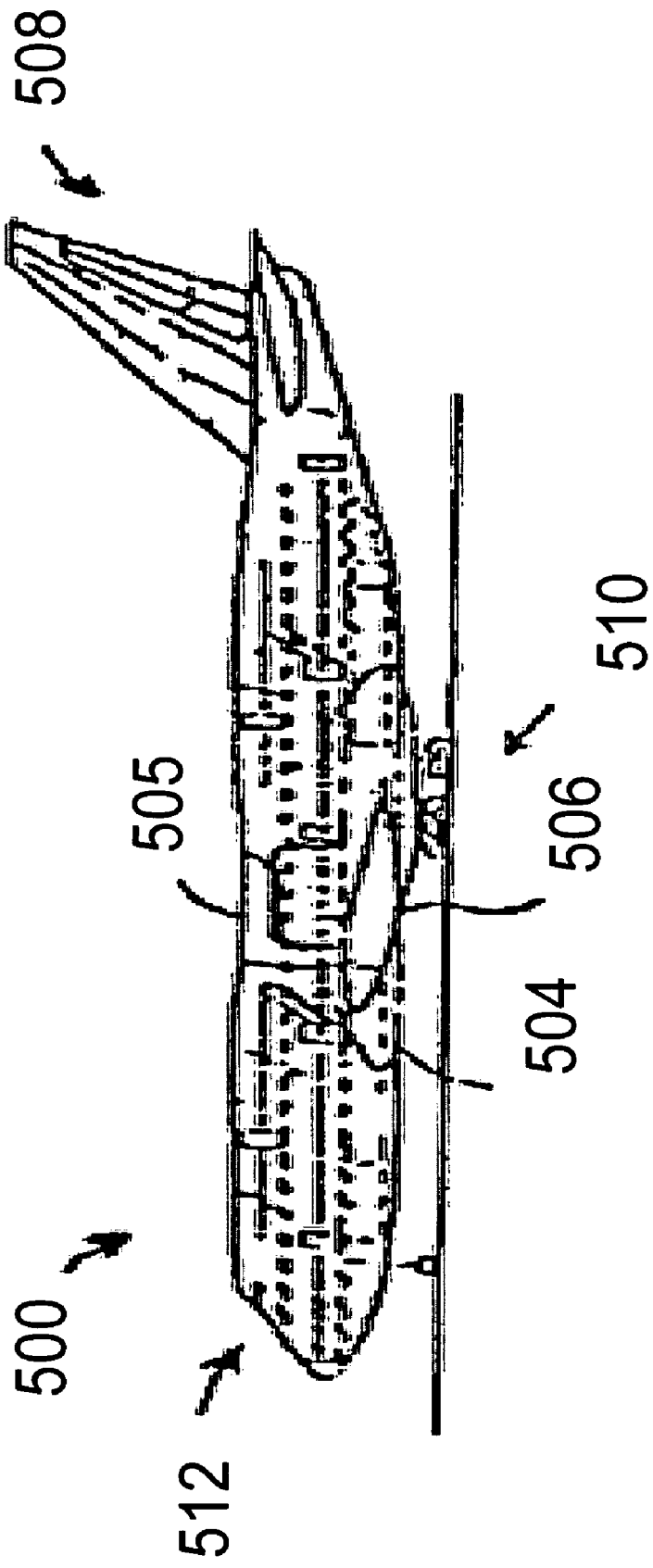
FIG. 5 is a side elevational view of an aircraft 500 in accordance with an embodiment of the present invention.

In a further embodiment, the electronic product definition 450 of FIG. 4 may represent that for a commercial aircraft. For example, FIG. 5 is a side elevational view of an aircraft 500 in accordance with an embodiment of the present invention. The aircraft 500 includes one or more propulsion units 504 coupled to a fuselage 505, wing assemblies 506 (or other lifting surfaces), a tail assembly 508, a landing assembly 510, a control system 512 (not visible), and a host of other systems and subsystems that enable proper operation of the aircraft 500. The aircraft 500 shown in FIG. 5 is generally representative of a commercial passenger aircraft, including, for example, the 737, 747, 757, 767, and 777 models commercially-available from The Boeing Company of Chicago, Illinois. The inventive methods disclosed herein, however, may also be employed in any other types of aircraft, such as rotary aircraft or manned military aircraft, including those described, for example, in The Illustrated Encyclopedia of Military Aircraft by Enzo Angelucci, published by Book Sales Publishers, September 2001.

Referring again to FIG. 4, in one representative embodiment, the product 450 may be the aircraft 500 of the type shown in FIG. 5, and the set of features 414 may be any of a multitude of various customer-defined options. For example, in one particular embodiment, the set of features 414 may be various types of interface features for aircraft engines, including, for example, those engines commercially-available from Rolls Royce, General Electric, and Pratt & Whitney. The callout 410 may therefore refer to the feature 412 that represents one particular engine interface feature selected by an end-user of the aircraft 500. In alternate embodiments, the features 414 may represent any of a wide variety of options that may be selected by the end-user, including airframe features, interior cabin features, cockpit features, weapons features, electronic surveillance features, or any other desirable product characteristics.

Embodiments of the present invention may advantageously provide engineering intent requirements in an electronic environment, including, for example, indicating characteristics of engineering requirements, objects, and relationships for the development and production of parts and products. Embodiments of methods in accordance with the present invention may advantageously provide engineering intent requirements in an electronic environment in an orderly and logical hierarchy, thereby providing efficient and flexible definition of engineering requirements for electronically-modeled products.

While preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for defining a set of electronic engineering requirements of an electronic product definition, comprising:
   providing at least one of a set of master requirements and a set of version requirements to be applied to the electronic product definition;
   referencing an electronic reference document from the at least one of the set of master requirements and the set of version requirements, the at least one of the set of master requirements and the set of version requirements including one or more particular engineering requirements to be applied to the electronic product definition, wherein the electronic reference document defines a process for accomplishing each of the one or more particular engineering requirements to be applied to the electronic product definition; and
   defining one or more callouts linked to at least one of the set of master requirements and the set of version requirements, wherein defining one or more callouts includes defining a callout configured to supercede a conflicting engineering requirement set forth in at least one of the set of master requirements and the set of version requirements, and wherein the one or more callouts are spatially qualified by an attached shape defining physical limits that the one or more particular engineering requirements are to affect.

2. The method of claim 1, wherein referencing an electronic reference document includes providing an electronic address to retrieve a general electronic document in a remote location.

3. The method of claim 2, wherein referencing an electronic reference document includes referencing a direct link to a specific topic within the electronic reference document.

4. The method of claim 1, wherein defining a process for accomplishing the one or more particular engineering requirements to be applied to the electronic product definition includes defining a manufacturing process.

5. The method of claim 1, wherein defining one or more callouts includes defining a callout that is applied within at least one of a master and version layer, and is applicable to the detail part or assembly in which it is attached.

6. The method of claim 1, wherein defining one or more callouts includes defining a callout that is applicable in a product context as defined by an applicability statement.

7. The method of claim 1, wherein defining one or more callouts includes defining a callout that represents a particular requirement with a specific location relative to the product, the specific location designated by at least a portion of the attached shape defining the physical limits.

8. The method of claim 1, wherein the attached shape defining physical limits is used only to locate the one or more particular engineering requirements.

9. The method of claim 1, wherein defining one or more callouts includes defining a callout that references a feature representing a product characteristic that is selectable by an end-user during a product development phase.

10. The method of claim 9, wherein defining a callout that references a feature includes defining a callout that references a feature adapted to supercede any conflicting engineering requirements set forth in the at least one of the set of master requirements and the set of version requirements.

11. A method for defining a set of electronic engineering requirements of an electronic product definition, comprising:
    providing at least one of a set of master requirements and a set of version requirements to be applied to the electronic product definition;
    defining a callout linked to the at least one of the set of master requirements and the set of version requirements, the callout being adapted to supercede a conflicting engineering requirement set forth in at least one of the set of master requirements and the set of version requirements, wherein the callout is spatially qualified by an attached shape defining physical limits that the at least one of the set of master requirements and the set of version requirements are to affect; and
    linking the callout to a process to be fulfilled in the manufacturing of the product.

12. The method of claim 11, wherein defining a callout includes defining a callout that is applied within at least one of a master and version layer, and is applicable to the detail part or assembly in which it is attached.

13. The method of claim 11, wherein defining a callout includes defining a callout that is applicable in a product context as defined by an applicability statement.

14. The method of claim 11, wherein defining a callout includes defining a callout that represents a particular requirement with a specific location relative to the product.

15. The method of claim 11, wherein defining a callout includes defining a callout that refers to a particular requirement with a located shape.

16. The method of claim 11, wherein defining a callout includes defining a callout that references a feature representing a product characteristic that is selectable by an end-user during a product development phase.

17. The method of claim 16, wherein defining a callout that references a feature includes defining a callout that references a feature adapted to supercede any conflicting engineering requirements set forth in the at least one of the set of master requirements and the set of version requirements.

18. The method of claim 11, further comprising referencing an electronic reference document from at least one of the set of master requirements and the set of version requirements, the electronic reference document including one or more particular engineering requirements to be applied to the electronic product definition.

19. The method of claim 18, wherein referencing an electronic reference document includes referencing a general electronic document location.

20. The method of claim 18, wherein referencing an electronic reference document includes referencing a direct link to a specific topic within the electronic reference document.

21. The method of claim 18, wherein linking the callout to a process includes linking the callout to a process defined in the electronic reference document, the process accomplishing the one or more particular engineering requirements to be applied to the electronic product definition.

22. A method for creating an electronic air vehicle definition, comprising:
   defining a set of electronic engineering requirements including at least one of a set of master requirements and a set of version requirements;
   referencing an electronic reference document from at least one of the set of master requirements and the set of version requirements, the at least one of the set of master requirements and the set of version requirements including one or more particular engineering requirements to be applied to the electronic air vehicle definition, wherein the electronic reference document defines a process for accomplishing each of the one or more particular engineering requirements to be applied to the electronic product definition;
   defining one or more callouts linked to at least one of the set of master requirements and the set of version requirements, wherein defining one or more callouts includes defining a callout configured to supercede a conflicting engineering requirement set forth in at least one of the set of master requirements and the set of version requirements, and wherein the one or more callouts are spatially qualified by an attached shape defining physical limits that the set of electronic engineering requirements are to affect; and
   applying the set of electronic engineering requirements to the electronic air vehicle definition.

23. The method of claim 22, wherein referencing an electronic reference document includes referencing a general electronic document location.

24. The method of claim 22, wherein referencing an electronic reference document includes referencing a direct link to a specific topic within the electronic reference document.

25. The method of claim 22, wherein defining one or more callouts includes defining a callout that references a feature adapted to supercede any conflicting engineering requirements set forth in the at least one of the set of master requirements and the set of version requirements.

26. The method of claim 22, wherein defining one or more callouts includes defining an engine type.

27. A method for creating an electronic air vehicle definition, comprising:
   defining a set of electronic engineering requirements including at least one of a set of master requirements and a set of version requirements;
   defining one or more callouts linked to the at least one of the set of master requirements and the set of version requirements, the callout being adapted to supercede a conflicting engineering requirement set forth in at least one of the set of master requirements and the set of version requirements, wherein the one or more callouts are spatially qualified by an attached boundary defining physical limits that the set of electronic engineering reciuirements are to affect;
   linking the callout to a process to be fulfilled in the manufacturing of the product; and
   applying the set of electronic engineering requirements to the electronic air vehicle definition.

28. The method of claim 27, wherein defining one or more callouts includes defining a callout that references a feature that is adapted to supercede any conflicting engineering requirements set forth in the at least one of the set of master requirements and the set of version requirements.

29. The method of claim 27, wherein defining one or more callouts includes defining an engine type.

30. The method of claim 27, further comprising referencing an electronic reference document from at least one of the set of master requirements and the set of version requirements, the electronic reference document including one or more particular engineering requirements to be applied to the electronic air vehicle definition.

31. The method of claim 30, wherein referencing an electronic reference document includes referencing a general electronic document location.

32. The method of claim 30, wherein linking the callout to a process includes linking the callout to a process defined in the electronic reference document, the process accomplishing the one or more particular engineering requirements to be applied to the electronic product definition.

* * * * *